United States Patent [19]
Portoulas

[11] 3,821,641
[45] June 28, 1974

[54] RESISTANCE LEVEL DETECTOR
[75] Inventor: Peter G. Portoulas, Chicago, Ill.
[73] Assignee: Ecos Electronics Corporation, Oak Park, Ill.
[22] Filed: Dec. 12, 1972
[21] Appl. No.: 314,403

[52] U.S. Cl. .............................................. 324/62
[51] Int. Cl. ........................................... G01r 27/02
[58] Field of Search ............................. 324/62, 140

[56] References Cited
UNITED STATES PATENTS
3,676,770  7/1972  Sharaf et al. ..................... 324/62 X
3,749,857  7/1973  Konig ................................ 324/62 X Primary Examiner—Stanley T. Krawczewicz
Attorney, Agent, or Firm—Merriam, Marshall, Shapiro & Klose

[57] ABSTRACT

A portable resistance level detector for determining the unknown resistance between a pair of test points under high voltage and low voltage test conditions is disclosed. More particularly, the detector includes a switching arrangement for selectively coupling regulated high-level and low-level DC potentials across the test points and a resistive threshold arrangement for sampling the resultant current to determine whether the unknown resistance is below certain preselected thresholds. If the resistance is below any of the thresholds set for high-level and low-level testing, an audio system is enabled to generate a particular audible tone associated with each threshold. A meter is also provided to provide an exact read-out of the resistance measured under high voltage test conditions. The high-level DC test voltage is, in turn, developed by a novel regulated voltage generator. The generator includes circuitry for developing a pulse train at a rate determined by the charging and discharging time constants of a capacitive element included in a control circuit. The pulses are subsequently rectified and filtered to provide a DC potential. A feedback network monitors the DC output potential to vary the charging time constant and hence the rate at which pulses are applied to the rectification network. In this manner, the DC potential is maintained at a constant level regardless of load conditions.

9 Claims, 3 Drawing Figures

RESISTANCE LEVEL DETECTOR

BACKGROUND OF THE INVENTION

The present invention relates generally to circuits for determining whether the resistance between two test points exceeds a predetermined threshold and more particularly to a resistance level detector for determining whether the isolation resistance between a pair of conductors or a conductor and ground falls below preselected thresholds under high voltage and low voltage test conditions. The present invention further relates to a novel regulated voltage generator for generating the high and low voltages required to run the tests.

Reference may be made to the following U.S. Pat. Nos. 3,553,572; 3,541,436; 3,284,707; 3,278,849; 3,221,317; 2,958,823; 2,946,951; and 2,918,054.

In the area of electronic communication systems, it is common practice to integrate several pieces of electronic equipment into a single system by electrically interconnecting them with shielded multi-conductor cables. Often the pieces are physically remote from one another so that the cables may be subject to diverse environmental factors such as heat, cold, moisture, etc. Thus, after a long period of usage, the multi-conductor cable may deteriorate, resulting in shorted conductors within the cable or moisture within the shield. When this occurs, of course, the equipment is quite likely to function improperly, if at all. Other problems may arise where out-dated equipment is replaced, but the original cables are still used. If the system then malfunctions, the replacement equipment may be thought to be at fault when, in fact, the cable is at fault. It is only after a complete set of tests have been run that it can be determined whether the cable is causing the malfunction.

Accordingly, the isolation resistance between conductors in the cable and between each cable and the grounded shield should be measured to determine whether the conductors are still adequately insulated from one another. This is generally accomplished by applying a voltage across the conductors under test and measuring the resultant "isolation" current flowing from one conductor to the other. Often, however, when the instrument user diverts his eyes to read a meter displaying the test results, the test probe will slip and must be repositioned. Also, the cables may be tested at remote points between pieces of equipment where a 120 vac line is not available to power the measuring device. Consequently, prior art isolation resistance measuring devices, or "meggers," have been hand-crank powered to generate the high voltage required for the test.

SUMMARY OF THE INVENTION

The resistance level detector of the present invention includes means for generating first and second DC potentials and subsequently regulating them to provide two sources of constant potential having different values. A switch means is also provided for selectively applying the constant potentials across a pair of test points so that the resistance therebetween may be determined under both high voltage and low voltage test conditions. The current flowing between the test points responsive to each of the constant DC potentials is monitored by threshold means to determine whether the resistance between the test points exceeds certain preselected thresholds. If the resistance is below any of the thresholds set for high voltage or low voltage testing, audio means are enabled to generate a particular tone associated with each threshold below which the resistance lies. Moreover, meter means are provided for measuring the current through the unknown resistance during high voltage testing to accurately determine the value of the unknown resistance.

More particularly, if the resistance is below a preselected threshold under low voltage test conditions or below another preselected threshold under high voltage test conditions, an interrupted tone will be produced. If, however, the resistance is below still another threshold during high voltage testing, a steady tone is generated.

Another important feature of the invention is a novel regulated voltage generator that is provided for developing the high voltage potential required by the resistance level detector. The generator itself includes means for developing a pulse train from an unregulated battery supply and rectifying the pulses to develop a high-level voltage at its output. The resultant output voltage is, in turn, regulated by a feedback means which varies the rate at which the pulses are generated responsive to the current drawn by a load connected to the output.

BRIEF DESCRIPTION OF THE DRAWINGS

The features of this invention which are believed to be novel are set forth with particularity in the appended claims. The invention and the advantages thereof, may be best understood, however, by reference to the following description taken in conjunction with the accompanying drawings, in which like reference numerals identify like elements in the several figures and in which:

PREFERRED EMBODIMENT OF THE INVENTION

Figure 1:
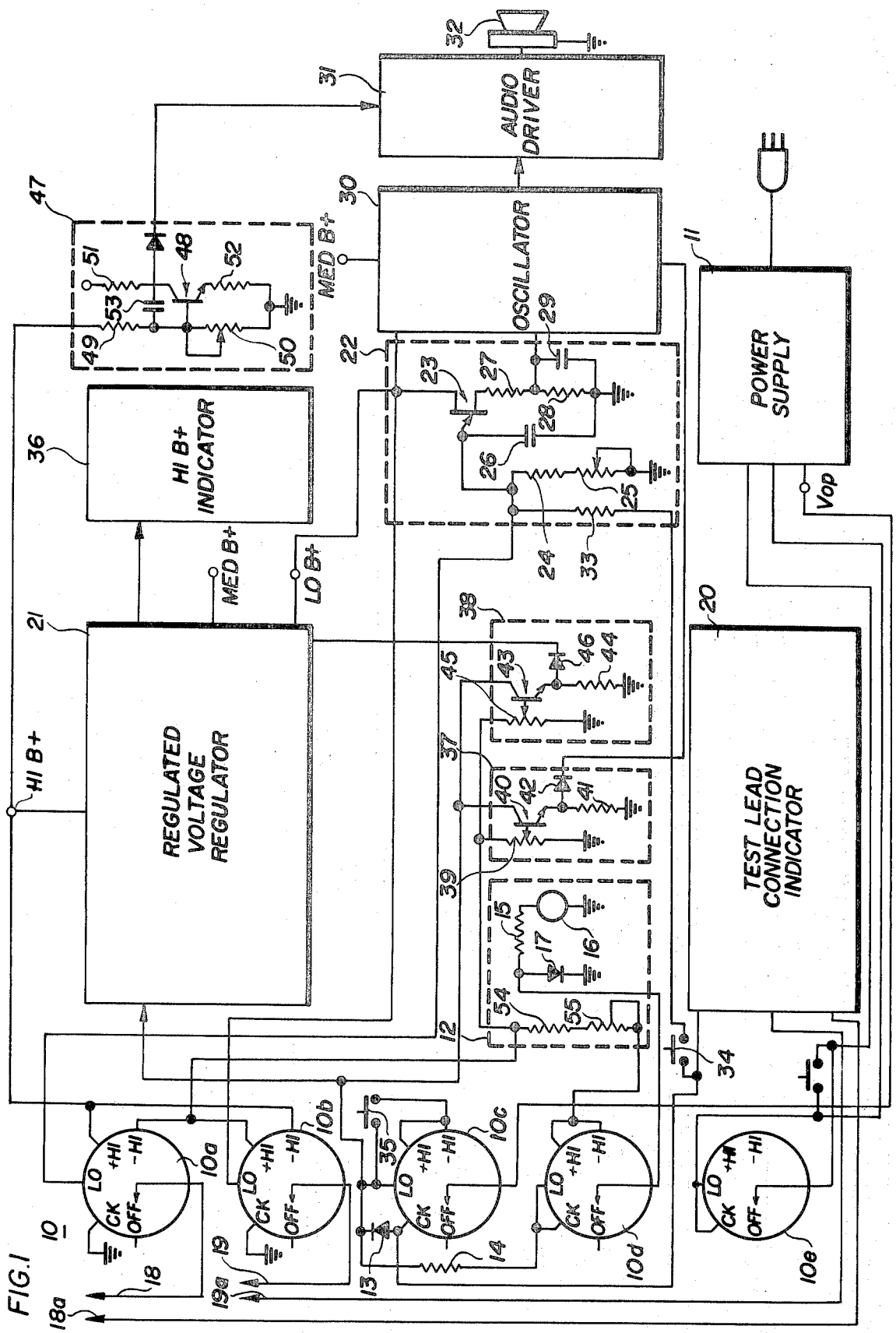
FIG. 1 is a combined schematic and block diagram of a resistance level detector in accordance with a preferred embodiment of the invention.

Referring now to FIG. 1, there is shown a resistance level detector for monitoring the unknown isolation resistance between two conductors or a conductor and ground under low voltage (e.g., 6 vdc) and high voltage (e.g., 500 vdc) test conditions, alerting the user whenever the resistance falls below certain preselected levels.

The detector includes a five-section rotary function switch, identified generally at 10, for selectively switching the detector to any of its five operating modes. When switch 10 is in its initial, or OFF, position, the power supply 11 is effectively disconnected from the remainder of the detector circuitry. In the other operating modes, however, power supply 11 generates a d-c operating potential (Vop) by means of an internal battery (not shown) or by rectifying and filtering the 120 vac line voltage coupled to its input, subsequently applying it through switch section 10c to other circuits in the detector. When the switch 10 is in the OFF position, the battery may be recharged if the detector is connected to the 120 vac line.

When function switch 10 is, in turn, switched to its second, or Circuit Check (CK) position, several circuit checks are performed to determine whether the detector is functioning properly so that an accurate measurement of isolation resistance will result. Initially, the d-c operating potential (Vop) produced by power supply 11 is checked to determine whether it is adequate to run the test. This determination is especially important when the resistance level detector is operated in the field where a 120 vac line voltage may not be readily available. Under those circumstances, the instrument must rely on the voltage produced by the internal battery. Consequently, the charged condition of the battery is determined by coupling the Vop output of power supply 11 through switch 10 to a meter circuit 12 where the Vop potential is measured. More particularly, the Vop potential from power supply 11 is applied to the meter circuit 12 through switch sections 10c and 10d which are electrically interconnected by diode 13 and resistor 14. The meter circuit 12 itself includes a resistor 15 and a voltmeter 16 serially connected between switch section 10d and a plane of reference potential, or ground. Accordingly, voltmeter 16 provides a visual indication of the d-c operating potential (Vop) developed by power supply 11. A diode 17 is also coupled in parallel with resistor 15 and meter 16 between the input of circuit 12 and ground to protect the meter 16 from excessive currents.

As a further circuit check, the test leads 18 and 19 provided for connecting the resistance level detector between the two conductors, or test points, whose isolation resistance is to be determined are checked for proper connection at the test points. The test leads 18 and 19 are coupled through switch sections 10a and 10b, respectively, to a point of reference potential, shown here to be ground, while a second pair of corresponding leads 18a and 19a are coupled to a test lead connection indicator 20. Test lead 18 and lead 18a may be incorporated in the same cable, and likewise, test lead 19 and lead 19a may form a second cable. When the isolation resistance between two conductors is to be determined, leads 18 and 18a are connected to one test point without touching each other while leads 19 and 19a are similarly connected to the other point under test. If a faulty connection is made between the test points and the leads so that either (or both) leads are not returned to ground through the corresponding test lead, a corresponding lamp (not shown) in the connection indicator 20 will be lit. Conversely, if the connections are good, the lamps will not be lit.

When function switch 10 is subsequently switched to the Low Voltage Test position (LO), the resistance level detector is operative to measure the isolation resistance between a pair of test points (e.g., two conductors or a conductor and ground) under Low Voltage (e.g. 6 vdc) test conditions. In the Low Voltage Test position, the d-c potential, Vop, from power supply 11 is once again coupled to the meter circuit 12 through resistor 14 so that the condition of the battery may be constantly monitored as a series of tests is run without switching to the Circuit Check mode.

Besides coupling the operating potential, Vop, from the power supply 11 to the meter circuit 12, switch section 10c further couples the Vop potential directly to a regulated voltage generator 21, providing an operating potential thereto. In addition to developing a source of high-level reference potential (e.g., 500 vdc) at its HI B+ output, the regulated voltage generator 21 further provides intermediate-level (e.g., 20 vdc) and low-level (e.g., 6.2 vdc) potentials at its MED B+ and LO B+ outputs, respectively.

The LO B+ potential from regulated voltage generator 21 is, in turn, applied to a low-voltage resistive threshold circuit 22. Under low-voltage test conditions, the threshold circuit 22, in effect, compares the isolation resistance between the two points under test with a preselected resistive threshold level and generates a representative control voltage at its output if the isolation resistance is found to be below the threshold. More particularly, the LO B+ potential is coupled through switch section 10b and test lead 19 to one of the test points while the other test point is coupled to the emitter electrode of a unijunction (UJT) transistor 23 through test lead 18 and switch section 10a. Thus, resistor 24 and potentiometer 25, which are serially connected between the emitter electrode and ground, combine with the isolation resistance being measured to form a voltage divider network. Consequently, a portion of the LO B+ potential is applied as bias to the UJT emitter electrode which is bypassed to ground by capacitor 26. The LO B+ potential is also applied to the B2 electrode of UJT transistor 23 while its B1 electrode is coupled to ground through a pair of resistors, 27 and 28 having their junction bypassed to ground by capacitor 29.

The resistance threshold level for low-voltage testing may be initially selected by connecting a known resistance corresponding to the desired threshold (e.g., 100k ohms) across test leads 18 and 19 and adjusting potentiometer 25 to bias the UJT transistor 23 so that it is just triggered to conduction. Accordingly, whenever the isolation resistance is at or below the 100k ohm threshold, the bias applied to the UJT emitter electrode is higher than the threshold bias, and the UJT transistor 23 is switched to conduction. Conversely, if the isolation resistance is greater than 100k ohms, the bias at the emitter electrode will not be sufficient to trigger the UJT transistor 23.

An oscillator stage 30 coupled to the junction of resistors 27 and 28 is enabled whenever te UJT transistor 23 is triggered responsive to an isolation resistance below the selected threshold. The oscillatory signal is then coupled to an audio driver circuit 31 where it is further processed before application to an audio reproducer, or speaker 32. Accordingly, the resultant audible signal produced by speaker 32 is an interrupted tone indicating that the isolation resistance is below the threshold level selected for low voltage testing.

A resistor 33 having a resistance value corresponding to the desired threshold level also couples the Vop output potential from power supply 11 to the emitter electrode of UJT transistor 23, providing still another circuit check when function switch 10 is in the Circuit Check (CK) position. Thus, when a push-button switch 34 interposed between switch 10 and resistor 33 is closed, the UJT transistor 23 is triggered, and the interrupted audio tone is generated, indicating that the low-voltage threshold circuit 22 is operative.

The resistance level detector also functions to determine the isolation resistance between the two test points under high voltage (e.g., +500 vdc) test conditions whevever function switch 10 is at its High Voltage Test position (+HI). Once again, the Vop operating potential from power supply 11 is coupled through switch section 10c to the regulated voltage generator 21. However, when the function switch 10 is in the +HI position, the Vop potential is coupled to the generator 21 through a push-button switch 35 which must be closed to enable the generator 21 and, consequently, the high voltage test circuitry. The resultant HI B+ potential developed by the regulated voltage generator 21 is then coupled to a HI B+ (500 vdc) indicator circuit 36 which indicates that the generator 21 is functional.

During the high voltage test the HI B+ potential is coupled through switch section 10a and test lead 18 to one of the two test points, or conductors, between which the isolation resistance is to be measured. The other test point, or conductor, is coupled through test lead 19 and switch section 10b to a first high voltage resistive threshold circuit 37 where the "isolation" current resulting from the application of the HI B+ potential across the test points is monitored to determine whether the corresponding isolation resistance is below a first preselected threshold level. Simultaneously, the "isolation" current is also coupled to a second high voltage resistive threshold circuit 38 where it is further determined whether the isolation resistance falls below still a second reference level.

More particularly, the first threshold circuit 37 includes a potentiometer 39 having one end coupled to test lead 19 and its other end grounded so that it combines with the isolation resistance being measured to, in effect, form a voltage divider network. Accordingly the current conducted through potentiometer 39 is dependent upon the combined resistances ot the unknown isolation resistance and potentiometer 39 so that the voltage drop developed across potentiometer 39 is inversely proportional to the isolation resistance measured. The resultant bias voltage developed at the wiper arm of potentiometer 39 is, in turn, coupled to the base electrode of transistor 40. Further, the Vop operating potential at switch section 10c is coupled through push-button switch 35 to the collector electrode of transistor 40, while the emitter electrode is coupled to ground through resistor 41.

The selection of the first high level resistive threshold proceeds in a manner nearly identical to in which the low voltage threshold was set. That is, a known resistance (e.g., 100k ohms) is connected across test leads 18 and 19, and the potentiometer 39 is then adjusted to bias transistor 40 so that it, in turn, just enables the oscillator stage 30 coupled to its emitter electrode by diode 42. Consequently, whenever the unknown isolation resistance is below the selected threshold, transistor 40 develops a control voltage at its emitter which is then applied to the oscillator 30. Once again, an interrupted audio tone is produced by speaker 32 indicating that the isolation resistance is below the first threshold set for high voltage testing.

As previously mentioned, the "isolation" current is also coupled to a second high voltage resistive threshold circuit 38, the operation and construction of which is almost identical to that of the first threshold circuit 37. More particularly, the Vop potential at switch section 10c is also coupled to the collector electrode of a transistor 43 having its emitter electrode coupled to ground through resistor 44. One end of potentiometer 45 is coupled to test lead 19, while its other end is connected directly to ground. Its wiper arm, in turn, is coupled to the base electrode of transistor 43. Thus, a second resistive threshold is selected by connecting the test leads 18 and 19 across a resistance of known value (e.g., 50k ohms) and adjusting potentiometer 45 to bias transistor 43 so that it produces a threshold control signal at its emitter electrode.

The threshold control signal at the emitter electrode of transistor 43 is, in turn, coupled through a diode 46 to the regulated voltage generator 21 where it biases a transistor (not shown) so that the HI B+ potential is decreased to its "half-voltage" condition. That is, when the isolation resistance is below the second preselected threshold, the potential at the HI B+ output of regulated voltage generator 21 falls to one-half its normal level, e.g., 250 vdc instead of 500 vdc.

The resultant "half-voltage" potential developed at the HI B+ output of generator 21 is, in turn, coupled to a steady tone circuit 47 comprising transistor 48 and its associated circuitry. More particularly, the bias potential developed at the junction of resistor 49 and potentiometer 50 which are serially connected between the HI B+ output and ground is applied to the base electrode of transistor 48. The collector electrode of transistor 48 is connected to the Vop output of power supply 11 through resistor 51, while its emitter electrode is coupled to ground through resistor 52. A capacitor 53 couples the base electrode to the collector electrode. Accordingly, where the isolation resistance is below the second preselected threshold (e.g., 50k ohms), the bias at the base electrode of transistor 48 drops as a result of regulated voltage generator 21 being biased to its "half-voltage" condition. Potentiometer 50, in turn, is preset so that transistor 48 is switched OFF whenever the bias drops so that the voltage developed at its collector electrode rises as a result of its non-conduction. Thus, whenever the isolation resistance is below the second (50k ohms) threshold, the bias applied to the audio driver circuit 31 by the steady tone circuit 47 is constant d-c potential. In turn, the speaker 32 is driven to produce a steady tone, indicating that the isolation resistance is below the second preselected threshold.

The isolation resistance may also be determined under negative high voltage (e.g., −500 vdc) conditions in a manner identical to that previously described for the positive high voltage test, by moving switch 10 to its negative High Voltage Test (−HI) position. In this position, switch sections 10a and 10b are electrically interconnected so that test lead 19 is coupled to the HI B+ output of regulated voltage generator 21 and test lead 18 is coupled to the inputs of the threshold circuits 37 and 38.

In either the positive (+HI) or negative (−HI) High Voltage Test positions, switch 10 also couples a portion of the "isolation" current to the meter circuit 12 through resistor 54 and potentiometer 55. Accordingly, besides giving an audible indication of the range in which the unknown isolation resistance lies, the resistance level detector also provide a meter reading for more precisely determining the actual resistance. Potentiometer 55 provides a means for calibrating the meter to coincide with the known value of a resistance coupled across test leads 18 and 19.

Figure 2:
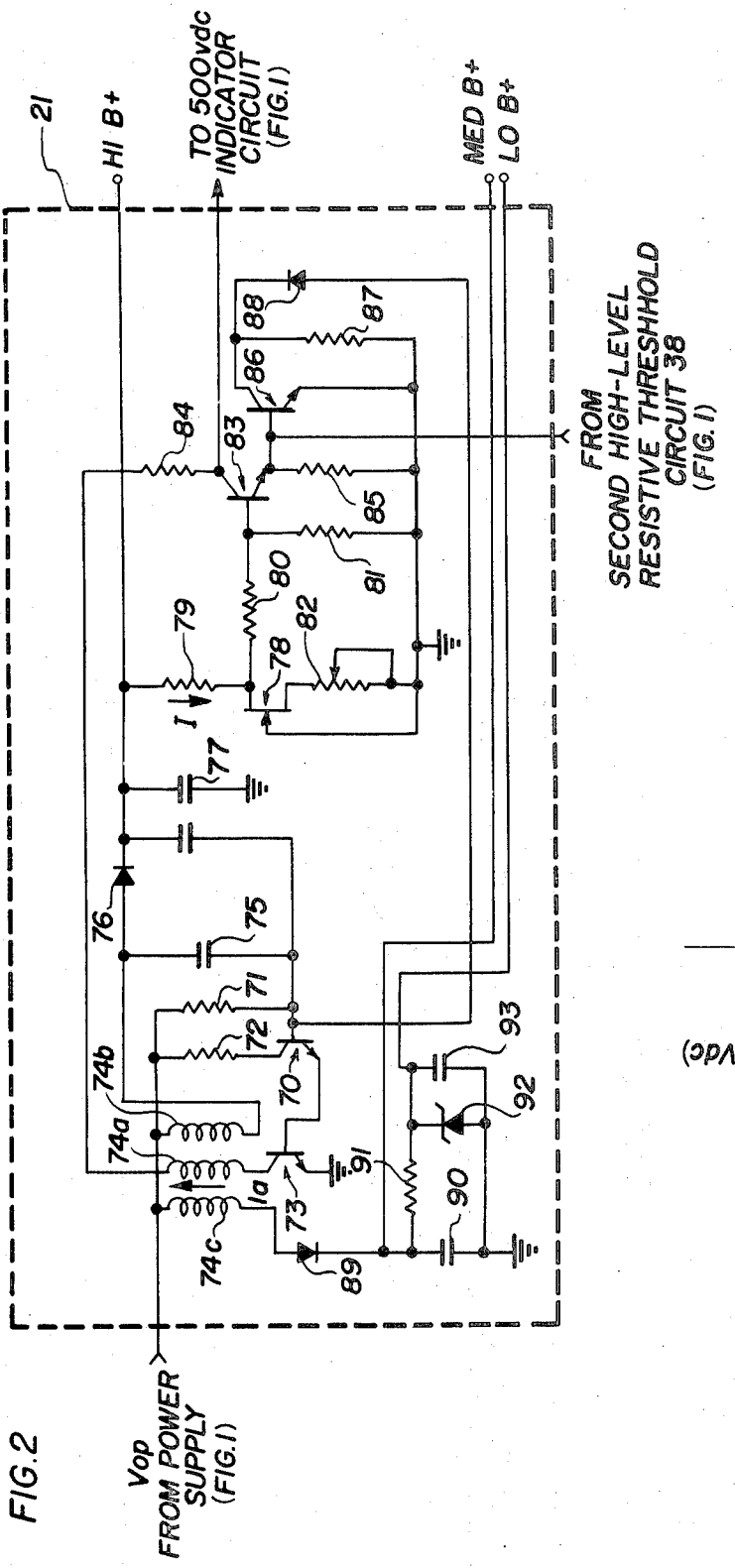
FIG. 2 is a schematic diagram of a regulated voltage generator in accordance with a preferred embodiment of the invention.

Referring now to FIG. 2, there is shown a regulated voltage generator 21 which, in accordance with the present invention, may be utilized in conjunction with the resistance level detector. Whenever the detector is operative (i.e., switch 10 is in any mode other than OFF), the Vop output potential from power supply 11 (FIG. 1) is coupled to the regulated voltage generator 21, providing a source of operating potential thereto. More particularly, the low-level (e.g., 6 vdc) Vop operating potential is coupled to the base and collector electrodes of transistor 70 through resistors 71 and 72, respectively, so that transistor 70 begins to conduct. The resultant potential developed at the emitter electrode of transistor 70, which is interconnected with transistor 73 in the well-known emitter-follower configuration, is then applied to the base electrode of transistor 73. The emitter electrode of transistor 73 is, in turn, connected to ground, while operating potential (Vop) is applied to its collector electrode through the primary winding 74a of transformer 74. Accordingly, when transistor 70 drives transistor 73 into conduction, the resultant current variations ($I_a$) developed in winding 74a are inductively coupled to transformer winding 74b, producing corresponding voltage variations thereacross. Because transformer 74 is constructed so that winding 74a and 74b are in-phase, the voltage developed across winding 74b is directly proportional to the current variations ($I_a$) in the primary winding 74a. Thus, as transistor 73 conducts more heavily, the voltage ($V_b$) produced across winding 74b likewise increases. A portion of this increasingly positive voltage is coupled through capacitor 75 to the base of transistor 70, causing heavier conduction in transistors 70 and 73 and correspondingly larger positive voltages across winding 74b until transistor 73 is finally saturated. During this time, capacitor 75 is charged to a level determined by its charging time constant, i.e., the capacitance of capacitor 75 X the input impedance of transistor 70. When transistor 73 saturates, the current through transformer winding 74a no longer increases, and as a result, the voltage developed by transformer winding 74b decreases to zero. Consequently, in the absence of positive voltage from winding 74b at the base of transistor 70, the capacitor 75 which was charged through transistors 70 and 73 when they were conductive applies a negative voltage to the base electrode of transistor 70, cutting it and, in turn, transistor 73 off. Capacitor 75 subsequently discharges through resistor 71 at a rate determined by its discharging time constant, i.e., the capacitance of capacitor 75 X the resistance of resistor 71. When it is completely discharged, the cycle is repeated. Accordingly, the voltage waveform at the junction of winding 74b and capacitor 75 comprises a pulse train which is, in turn, rectified by diode 76 and capacitor 77 to develop the HI B+ (500 vdc) potential at the corresponding output.

The regulating circuitry associated with the high-voltage generator includes a field-effect (FET) transistor 78 having its drain electrode coupled to the junction of diode 76 and capacitor 77 by resistor 79 and to ground through serially connected resistors 80 and 81. The gate electrode of FET transistor 78 is coupled directly to ground while its source electrode is coupled through potentiometer 82 to ground. In this configuration, the FET transistor 78 operates as a constant current source. That is, regardless of the current (I) flowing through resistor 79, a constant portion is conducted through FET transistor 78 while the remainder is passed through resistors 80 and 81. Thus, under "no load" conditions, the voltage at the HI B+ output may be set to a desired level (e.g., 500 vdc) by adjusting potentiometer 82. Since the current through FET transistor 78 is constant, once potentiometer 82 is adjusted, any change in the current I through resistor 79 is reflected entirely as a current change through resistors 80 and 81. Consequently, when the HI B+ output is "loaded," the output voltage decreases and the current I through resistor 79 also correspondingly decreases. Accordingly, the total change in current (I) through resistor 79 is mirrored in the current change through resistors 80 and 81.

The decreased current through the voltage divider arrangement comprising resistors 80 and 81, in turn, reduces the bias to the base electrode of transistor 83 so that it conducts less heavily. Transistor 83 derives its operating potential from the Vop supply connected to its collector electrode through resistor 84, while its emitter electrode is coupled to ground through resistor 85. Accordingly, when the HI B+ output is increasingly loaded, the emitter voltage developed by transister 83 decreases.

The potential at the emitter electrode of transistor 83 is then coupled to the base electrode of transistor 86 which has its emitter electrode tied directly to ground and its collector electrode connected to ground through resistor 87. The collector electrode of transistor 86 is further connected to the base of transistor 70 through a diode 88. Consequently, the collector-to-emitter output impedance of transistor 86 modifies the charging time constant of capacitor 75. That is, transistor 86 provides a second path for the current charging capacitor 75. Thus, when the HI B+ output is loaded, the impedance provided by transistor 86 increases and capacitor 75 will be charged to a lower level. As a result, capacitor 75 discharges more rapidly so that transistor 70 is cut-off for a shorter period of time. Accordingly, the pulse generator network comprising transistors 70 and 73 generates its output pulses at a faster rate so that the HI B+ output is maintained at its rated output.

Figure 3:
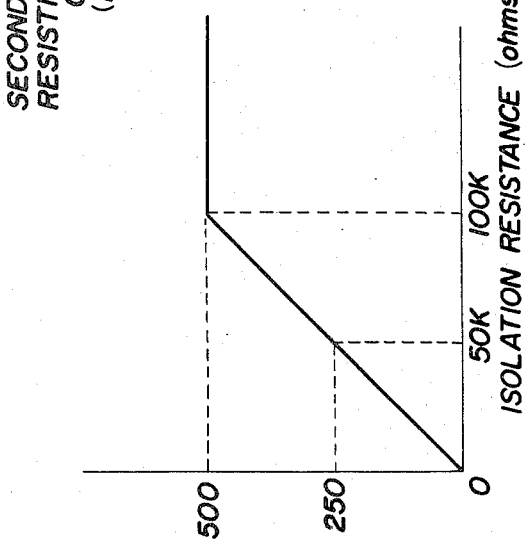
FIG. 3 illustrates the Output Voltage v. External Load characteristics of the regulated voltage generator shown in FIG. 2.

As previously mentioned in connection with the description of the steady tone circuit in FIG. 1, the HI B+ output may be reduced to its half-voltage condition. This is accomplished by applying the threshold voltage from the second high voltage resistive threshold circuit 38 to the base electrode of transistor 86 whenever the isolation resistance is below the preselected threshold. In this manner, the conduction and hence impedance of transistor 86 can be controlled to decrease the rate at which the output pulses are generated and applied to the rectification network. Thus, the output voltage of the regulated voltage generator can be externally controlled to correspond with a particular isolation resistance as shown in FIG. 3.

An auxiliary power supply with intermediate (MED B+) and low-level (LO B+) outputs is provided by including a third winding 74c in transformer 74. One end of winding 74c is coupled to the source of operating potential (Vop) while its other end is connected through diode 89 and capacitor 90 to ground. The value of the intermediate-level voltage (e.g., 20 vdc) developed at the junction of diode 89 and capacitor 90 depends on the turns ratio between windings 74a and 74c. A resistor 91 coupled to the junction of diode 89 and capactor 90 drops the intermediate-level (MED B+) output voltage to a low-level (LO B+) voltage. A zener diode 92 connected between the LO B+ output and ground regulates the LO B+ output potential, and a capacitor 93 coupled to ground bypass the LO B+ output to ground.

Accordingly, the resistance level detector that has been described is suitable for determining the isolation resistance between two conductors or a conductor and ground under both low and high voltage test conditions. However, it should be realized that the resistance level detector or the present invention is not limited to measuring only isolation resistances. Rather, it may also be used to determine any unknown resistance between two test points or to check the continuity of conductive paths between two points in a circuit. Because the detector generates distinct audible signals when the resistance is below preselected threshold levels, the instrument user is not required to divert his eyes to read the test results on a meter. If, however, a more accurate measurement is desired, meters are also included to more specifically indicate the actual resistance. Furthermore, a unique regulated voltage generating arrangement has been included to develop the requisite high-level test voltages from a battery supply thereby enhancing the portability of the resistance level detector.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. A resistance level detector for measuring the unknown resistance between first and second test points under low voltage and high voltage test conditions, said detector comprising in combination:
   generator means for developing voltage-stabilized high-level and low-level DC potentials;
   switch means interconnecting said generator means and said unknown resistance for selectively applying either of said voltage stabilized DC potentials to said resistance;
   threshold means coupled to said unknown resistance for establishing preselected resistive threshold levels, by monitoring the current conducted through said unknown resistance during low voltage and high voltage testing to determine whether said unknown resistance is below any of said preselected thresholds;
   audio means activated by said threshold means for generating a tone associated with a particular one of said preselected thresholds when said threshold means determines that said unknown resistance is below said particular threshold; and
   meter means coupled to said unknown resistance for measuring the current conducted through said unknown resistance during high voltage testing to provide an accurate determination of said unknown resistance.

2. A resistance level detector in accordance with claim 1 including supply means comprising a battery for providing an operating potential to said generator means, said operating potential enabling said generator means to develop said voltage-stabilized high-level and low-level DC potentials.

3. A resistance level detector in accordance with claim 2 wherein said switch means couples said meter means to said supply means during low voltage testing, said meter means monitoring the current from said supply means for providing a visual indication of the charged condition of said battery to insure that said generator means is properly functioning.

4. A resistance level detector in accordance with claim 1 wherein said threshold means includes means for establishing a first selectable threshold during low voltage testing and enabling said audio means to generate an interrupted tone whenever said unknown resistance is below said first threshold, said threshold means also establishing second and third selectable thresholds during high voltage testing and enabling said audio means to generate an interrupted tone when said unknown resistance is below said second threshold and a steady tone when said unknown resistance is below said third threshold.

5. A resistance level detector in accordance with claim 4 including oscillator means and steady tone means for driving said audio means, said audio means generating an interrupted signal when said oscillator means are enabled and a steady tone responsive to steady tone means being enabled.

6. A resistance level detector in accordance with claim 5 wherein said means for establishing said first threshold includes first variable impedance means and first amplifier means, said first variable impedance means being serially connected with said unknown resistance between said first test point and a plane of a reference potential during low voltage testing, said first variable impedance being adjusted to bias said first amplifier means to conduction whenever said unknown resistance is below said first threshold, said first amplifier means enabling said oscillator so that said audio means generates an interrupted tone.

7. A resistance level detector in accordance with claim 5 wherein said means for establishing said second threshold includes second variable impedance means and second amplifier means, said second variable impedance means being serially connected with said unknown resistance between said first test point and a plane of reference potential during high voltage testing, said second variable impedance being adjusted to bias said second amplifier means to conduction whenever said unknown resistance is below said second threshold, said second amplifier means enabling said oscillator means so that said audio means generates an interrupted tone.

8. A resistance level detector in accordance with claim 5 wherein said means for establishing said third threshold includes third variable impedance means and third amplifier means, said third variable impedance means being serially connected with said unknown resistance between said first test point and a plane of reference potential during high voltage testing, said third variable impedance means being adjusted to bias said third amplifier means to conduction whenever said unknown resistance is below said third threshold, said third amplifier means applying a control signal to said generating means to reduce said high-level DC potential to an intermediate level enabling said steady tone means so that said audio means generates a steady tone.

9. A resistance level detector in accordance with claim 8 wherein said steady tone means comprises amplifier means, said amplifier means being switched from conduction to non-conduction whenever said high-level DC potential is reduced to said intermediate level, said amplifier means developing an increased output voltage for driving said audio means to generate a steady tone when said unknown resistance falls below said third threshold.

* * * * *

PO-1050
(5/69)

UNITED STATES PATENT OFFICE
CERTIFICATE OF CORRECTION

Patent No. 3,821,641          Dated June 28, 1974

Inventor(s) Peter G. Portoulas

It is certified that error appears in the above-identified patent and that said Letters Patent are hereby corrected as shown below:

Column 3, line 23, insert "-" after serially.

Column 4, line 46, "te" should be --the--.

Column 4, last line "whevever" should be --whenever--.

Column 5, lines 33, "ot" should be --to--.

Column 6, lines 60, "provide" should be --provides--.

Column 8, line 19 "transister" should be --transistor--.

Column 8, line 64, "capactor 90" should be --capacitor 90--.

Column 9, line 8 "or" should be --of--.

Column 10, lines 27, "a" at the end of the line should be omitted.

Signed and sealed this 10th day of December 1974.

(SEAL)
Attest:

McCOY M. GIBSON JR.          C. MARSHALL DANN
Attesting Officer          Commissioner of Patents